United States Patent [19]

Roch

[11] 4,324,047
[45] Apr. 13, 1982

[54] UNIVERSAL HIGH SPEED HOLDER

[75] Inventor: Jacques L. Roch, Half Moon Bay, Calif.

[73] Assignee: Xynetics, Inc., Santa Clara, Calif.

[21] Appl. No.: 150,553

[22] Filed: May 16, 1980

Related U.S. Application Data

[63] Continuation of Ser. No. 931,409, Aug. 7, 1978, abandoned, which is a continuation of Ser. No. 707,893, Jul. 22, 1976, abandoned.

[51] Int. Cl.³ ............................................. B43L 13/00
[52] U.S. Cl. .................................................... 33/18 R
[58] Field of Search .................... 33/18 R; 346/29, 141

[56] References Cited

U.S. PATENT DOCUMENTS

| | | | |
|---|---|---|---|
| 3,401,401 | 9/1968 | Read et al. | 346/141 X |
| 3,550,276 | 12/1970 | Kramer | 33/18 R |
| 3,593,426 | 7/1971 | Domagalski | 33/18 R |
| 3,753,384 | 8/1973 | Anfindsen | 33/18 R X |
| 3,781,907 | 12/1973 | Gerber | 346/140 |
| 3,864,695 | 2/1975 | Nagashima et al. | 33/18 R |
| 4,015,269 | 3/1977 | Edo | 33/18 R |
| 4,091,393 | 5/1978 | Masuyama et al. | 33/18 R X |
| 4,157,552 | 6/1979 | Nakajima | 33/18 R X |

Primary Examiner—Charles E. Phillips
Attorney, Agent, or Firm—Ellsworth R. Roston

[57] ABSTRACT

An apparatus for making drawings including a platen, an X-Y forcer slidably connected to the platen and a high speed holder adjustably connected to the forcer. The holder includes a plurality of separately actuatable mechanisms with each mechanism being connected to a tool for movement of the tool into or out of contact with a working surface. Means are included to precisely control each of the mechanisms in controlling the degree of contact which the tools make with the working surface. Also, means are included to precisely position each tool with respect to the mechanism which moves the tool into contact with the working surface.

An apparatus for performing a working operation on a surface which apparatus includes a platen, an X-Y forcer slidably mounted thereon and a tool carried by the forcer for contact with the surface. Additionally, the apparatus includes means to vary the force applied by the tool against the working surface in response to the speed of movement of the tool with respect to the surface.

35 Claims, 14 Drawing Figures

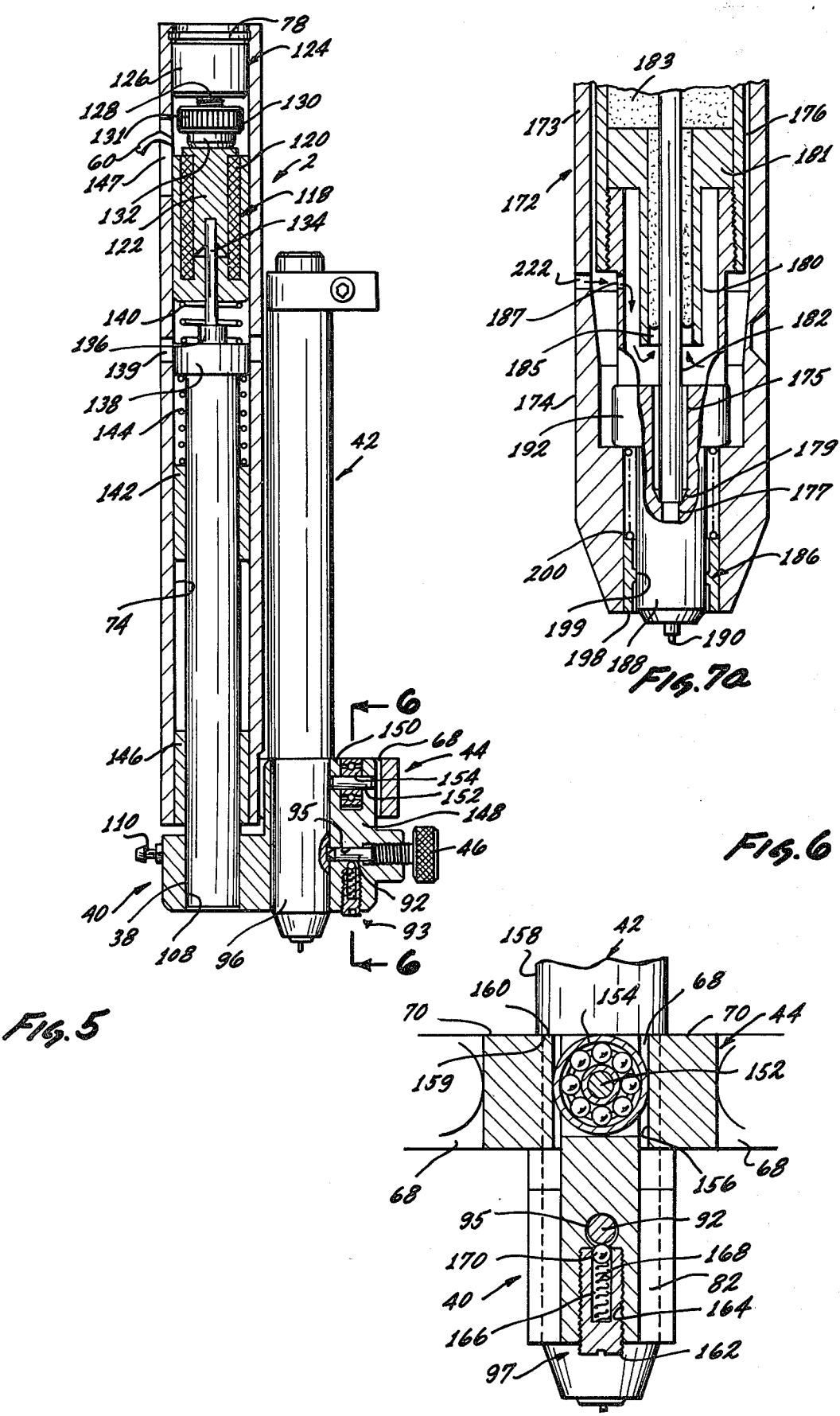

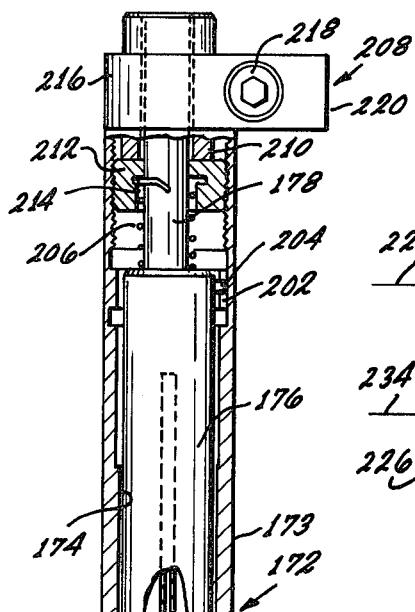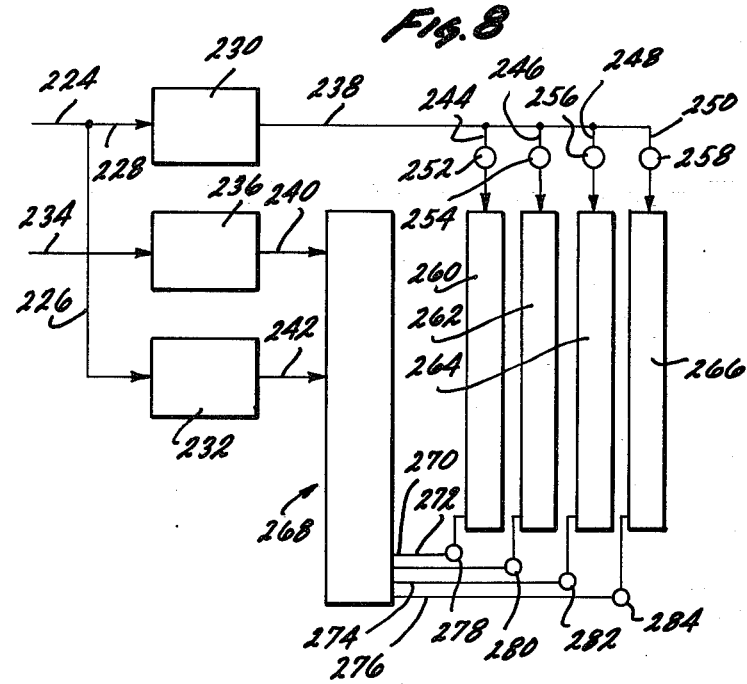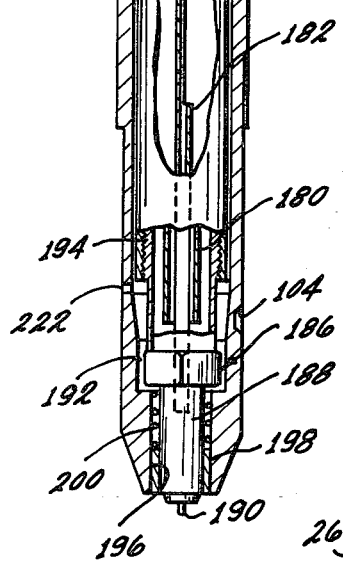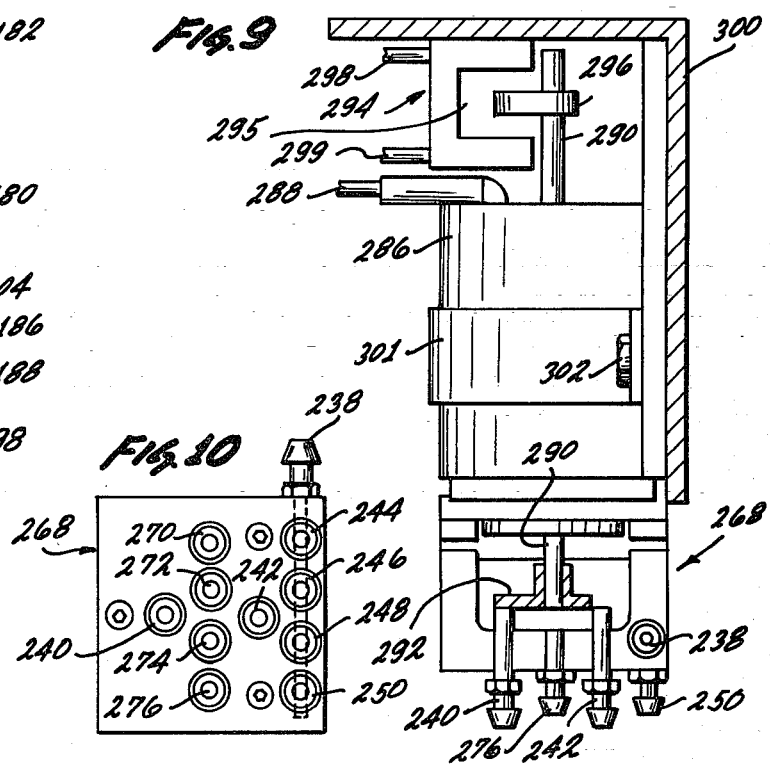

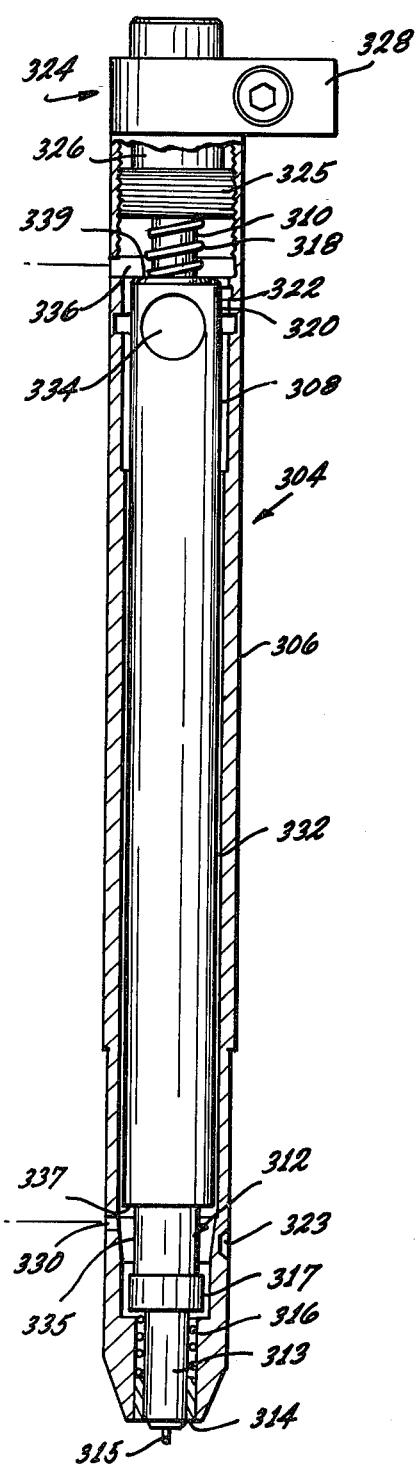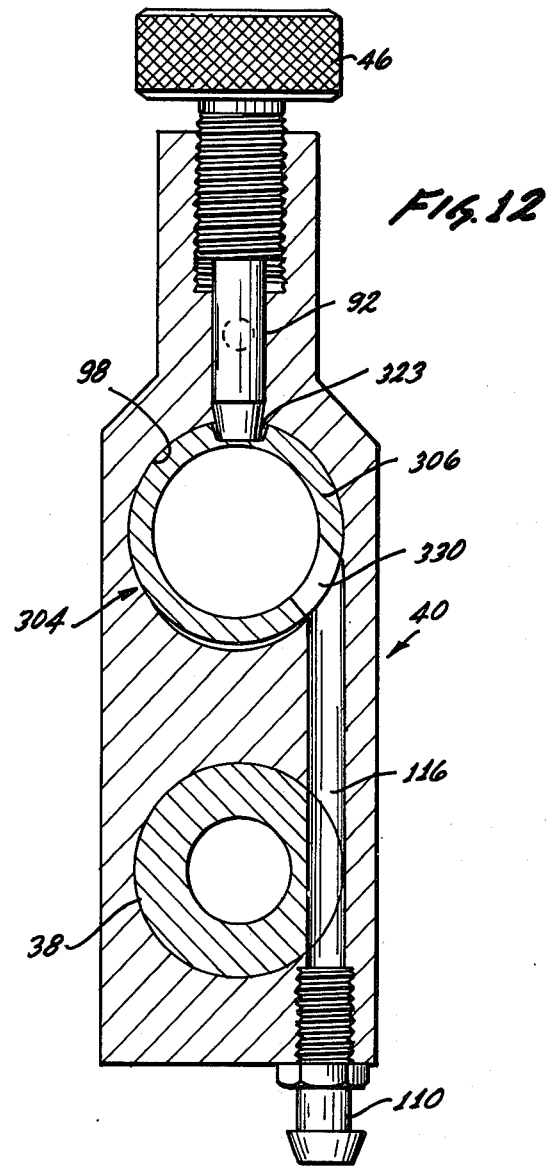

UNIVERSAL HIGH SPEED HOLDER

This is a continuation of application Ser. No. 931,409 filed Aug. 7, 1978, which is in turn a continuation of application Ser. No. 707,893 filed July 22, 1976, both now abandoned.

BACKGROUND OF THE INVENTION

Due to inflation, labor costs have been steadily increasing-particularly in the industrialized countries. These costs have not been matched, in many cases, by a corresponding increase in the productivity of labor. Accordingly, it has become increasingly difficult for companies in high labor cost areas to compete efficiently in world markets.

In an effort to remain competitive, various labor-saving devices have been adopted by companies whose labor costs are high. As an example, computers are now widely used to carry out a whole variety of operations which were, at one time, done manually. Through the use of computer technology, the industrialized nations have managed to remain competitive in spite of the rapidly escalating cost of labor.

In the design of a new product, it is generally necessary to first prepare a working drawing of the proposed product. In making a working drawing, it is frequently very desirable to make the drawing to a very accurate scale since the drawing may then be used in determining the desired tolerances for the various components.

In many cases, an overall design may require the efforts of a large number of designers in which one group may design one component while other groups design other components of the complete structure. Finally, when the efforts of all of the groups have been completed, the separate designs are put together to produce a master drawing in the form of a complete assembly or, in the case of a manufacturing facility, in the form of a complete layout.

Not surprisingly, when the work efforts of a large number of people are assembled in the form of a master drawing, the master drawing may reveal errors in the individual designs as, for example, when the parts of a complex machine do not properly fit together. Also, in a plant layout or building design, a master drawing may indicate that the individual designs are conflicting. Thus, the master layout may indicate that an air-conditioning duct may pass through a beam or that lubricant lines for a given piece of machinery may pass through a space reserved for process piping.

For the reasons indicated, it is frequently necessary that drawings be made with great accuracy. To do this manually may be both time consuming and expensive. Accordingly, drafting machines have been developed in which the output from a computer may be used to move tools in a very accurate manner relative to a working surface such that the drawing is prepared automatically.

Previous drafting machines have had certain drawbacks, particularly when the movement of the tools relative to the working surface was relatively rapid. In this instance, the tools were frequently not positioned relative to the working surface with the desired degree of accuracy. When the speed of movement of the tools relative to the working surface is increased, the tools may have a tendency to move away from the working surface and the accuracy of the resulting drawing is, thereby, impaired.

Accordingly, it would be desirable if a machine could be devised for more accurately preparing drawings since this would reduce the cost of the drawings. Further, it would be desirable to provide a machine in which the forces applied by the tools against the working surface could be varied in proportion to the speed of movement of the tools relative to the surface. This would then provide a means for overcoming the tendency of tools to move away from the working surface as the speed of movement of the tools is increased.

Additionally, it would be desirable to provide improved tools, particularly an ink-supplied pen of greater simplicity and accuracy. Desirably, such a pen would be able to ride over minor irregularities in the working surface without damage to the pen point. Also, it would be desirable to control the ink flow from the pen onto a working surface in proportion to the speed of movement of the pen relative to the surface. This would provide an increased ink flow rate onto the working surface when the pen was moved at higher speeds with respect to the working surface. However, at the same time, with the pen at rest or being moved slowly with respect to the working surface, the ink flow rate would be reduced so as to not drip ink onto the working surface.

The above need for great accuracy and speed in the making of drawings is particularly acute in the making of drawings on a plastic surface. For example, drawings may be made on a sheet of Mylar having a thin ruby coating thereon of approximately one mil in thickness. By either scribing lines on the ruby coated surface or by cutting the ruby coated surface to remove portions of the coating, the resulting drawing may exhibit great contrasts in color. Where the ruby coating remains intact, the surface coloration will be a reddish color. However, where the ruby coating has been removed, the Mylar will appear transparent. Thus, the drawing exhibits the contrast that is provided by having transparent lines or areas viewed against a reddish background.

In cutting a ruby coating to make a drawing on Mylar, great accuracy is required since it is essential that the cut lines in the ruby coating meet very precisely. Also, it is necessary that the cut lines or scribing lines only penetrate through the ruby coating while not marring the underlying sheet of Mylar. Also, the resistance of the ruby coating to cutting will vary in proportion to the speed of the blade with respect to the coating. This variation will have a tendency to move the cutting tool away from the working surface as the speed of movement of the cutting tool is increased relative to the surface. If the cutting tool is moved sufficiently away from the working surface, the tool will not perform its intended function in an accurate manner and the resulting drawing will be flawed.

SUMMARY OF THE INVENTION

In solving the aforementioned problems, the present invention provides an apparatus for making drawings in which an X-Y forcer is movably connected to a platen with a high speed holder being adjustably connected to the X-Y forcer. The high speed holder includes a plurality of separately actuatable mechanisms with each mechanism being connected to a tool for movement of the tool into or out of contact with a working surface. Additionally, means may be provided to precisely control each mechanism in terms of the degree of contact which is made by the tool with the working surface.

Also, means may be provided to precisely position each tool with respect to the mechanism which moves the tool into contact with the working surface. In this manner, a greater degree of accuracy is obtainable in the making of drawings in which the tools are moved at relatively high rates of speed with respect to the working surface.

Additionally, the present apparatus may include means to synchronize the movements of the various tools with respect to the high speed holder. In other manner, complex operations may be carried out in which various tools are operated in unison to achieve a combined result. Additionally, means may be included to vary the degree of contact of the tools with the working surface in response to the speed of movement of the tools with respect to the surface. In this manner, the degree of contact may be increased as the speed of movement of the tools is increased to compensate for the tendency of the tools to move away from the working surface at increased speeds.

The means to synchronize the movement of tools carried by the high speed holder may include a plurality of shoes in which each shoe interconnects one mechanism with a tool. Additionally, means may be provided to slidably receive a plurality of shoes and to guide the shoes in synchronized paths of movement with the means for guiding the shoes being fixed in its position relative to the high speed holder.

Rigid support means may also be provided to interconnect the X-Y forcer with the high speed holder such that the position of the holder precisely follows the position of the forcer during its high speed movement. In positioning the high speed holder with respect to the rigid support means, the holder may be rotated with respect to the support means by at least a pair of hinges positioned between the holder and the support means along a line of alignment. Additionally, adjustment means may be provided which are positioned between the holder and the support at a point which is displaced laterally from the line of alignment of the hinges. The adjustment means may then provide a rotating force to the holder to adjustably rotate the holder about the hinges in varying the rotational position of the holder with respect to the rigid support.

In varying the degree of contact between the tools and the working surface in response to the speed of movement of the tools, the apparatus may include means to provide a pressure output and means to convey the pressure to the tools. The tools may include piston means therein which is positioned to supply a force to the tools that is directed toward the working surface. Means are provided to vary the pressure output in response to the speed of movement of the tools. Thus, the pressure output to the tools automatically varies the contact pressure of the tools against the working surface in response to the speed of movement of the tools.

In varying the degree of contact which the tools make with the working surface, the apparatus may include a vacuum source and a pressure source which are connected to a mixing valve. The mixing valve may include a valve member which is shaped and positioned to selectively vary the mixture of pressure and vacuum that are supplied to the valve to vary the output pressure from the valve. Further, means are provided to vary the position of the valve member in response to the speed of movement of the tools with respect to the working surface. Each of the tools may contain piston means which are positioned to supply forces to the tools that are directed toward the working surface. The pressure supplied to the tools by the valve may then be increased as the speed of the tools is increased which, in turn, increases the degree of contact between the tools and the working surface.

In one embodiment of the invention, the apparatus of the invention may be a general purpose apparatus for performing any working operation on a surface and the apparatus may include a platen, an X-Y forcer which is slidably mounted on the platen, and a tool which is carried by the forcer for contact with the working surface. The apparatus may include means for increasing the force that is applied by the tool against the working surface in response to the speed of movement of the tool with respect to the surface. Thus, increased resistance of the working surface to the tool at higher tool speeds is counterbalanced by the increased force of the tool against the working surface. In varying the force applied by the tool to the working surface, means may be provided to produce a pressure which is proportional to the speed of movement of the tool with respect to the working surface. Moreover, means associated with the tool may receive the pressure to convert the pressure into an increase in the force of the tool against the working surface at increased tool speeds. The tool may be an ink-containing pen in which case means may also be employed to increase the flow rate of ink from the pen onto the working surface in response to the speed of movement of the pen with respect to the working surface. Thus, as the speed of movement of the pen is increased, the flow rate of ink from the pen is increased and, conversely, when the speed of movement of the pen is decreased, the flow rate of ink from the pen is decreased.

A further aspect of the invention may include an ink-containing pen which includes a pen body, an ink reservoir within the pen body, a pen point, and a capillary tube leading from the reservoir to the pen point. The capillary tube may have a size which is sufficient to draw ink from the reservoir and to transmit ink to the pen point as the pen is used. The rate at which ink is conveyed from the reservoir to the pen point may, thus, vary in proportion to the rate at which ink is removed from the pen point and applied to the working surface. However, the size of the capillary tube is sufficiently small to prevent the flow of ink from the pen point when the pen is not in use. This, then, prevents undesired leakage of ink from the pen point.

Additionally, the ink-containing pen may include means to resiliently suspend the pen point with respect to the pen body. This may permit the pen point to ride over irregularities on a working surface during usage of the pen. Further, means may be provided to resiliently bias the pen point in a direction away from the pen body. Thus, the movement of the pen point toward the pen body during usage of the pen may be resiliently resisted.

The resilient suspension of the pen point with respect to the pen body may be provided by a first spring which is positioned to resiliently bias the pen point in the direction of the pen body. A second spring may be provided which is positioned to resiliently bias the pen point in a direction away from the pen body. The strength of the first and second springs may be regulated such that the force exerted by the springs is sufficient to resiliently suspend the pen point at an equilibrium position while resiliently resisting the movement of the pen point from its equilibrium position in a direction toward the pen body.

In still another embodiment of the invention, I have provided a pressurized tool which includes a tool body, a working member carried by the tool body for contact with a working surface, an inlet to the tool body, and means within the tool body to receive a pressure input through the inlet and to convert the pressure input into a resilient biasing force on the working member which is directed away from the tool body. The working member of the pressurized tool may, for example, be a knife blade. Further, means may be provided to protect the knife blade from breakage on high speed contact of the knife blade with the working surface and means may be provided to precisely position the knife blade with respect to the tool body.

Also, the working member of the pressurized tool may be a pen tip. An ink reservoir may be provided in communication with the pen tip with means to transmit the pressure input to the tool body to the ink reservoir. Thus, ink flow from the reservoir to the pen tip may be increased in proportion to the speed of movement of the pen tip with respect to a working surface. Also, means may be included to impose a reduced pressure within the reservoir when the pressurized pen is not in use. In this manner, undesired leakage of ink from the pen tip may be prevented.

BRIEF DESCRIPTION OF THE DRAWINGS

To illustrate a preferred embodiment of the invention, reference is made to the accompanying drawings in which:

FIG. 5 is an elevational view, partly in section, through one of the mechanisms within the high speed holder which illustrates the mechanism and the manner in which the mechanism may be adjusted to control the movement of a tool with respect to a working surface;

FIG. 6 is a sectional view taken along line 6—6 of FIG. 5 which illustrates the manner in which the movement of a plurality of tools carried by the high speed holder may be coordinated such that the tools move in substantially the same paths with respect to the holder;

FIG. 7 is an elevational view, partly in section, illustrating the structural details of an ink-containing pen;

FIG. 7a is an enlarged sectional view of the lower end of the pen of FIG. 7 illustrating the manner in which ink is conveyed from an ink reservoir to the pen tip while air flows to the reservoir to maintain the ink supply under atmospheric pressure;

FIG. 8 is a schematic flow diagram illustrating the transmission of reduced pressure to the upper portions of tools carried by the high speed holder when the tools are not in use and the transmission of pressure to the lower portions of the tools when they are in use with the pressure being varied in response to the speed of movement of the tools;

FIG. 9 is an elevational view, partly in section, of a motor-driven transducer which provides pressure to tools carried by the high speed holder with the pressure being proportional to the speed of movement of the tools;

FIG. 10 is a bottom view of the transducer shown in FIG. 9 which illustrates an arrangement of input lines and output lines in providing a compact transducer structure;

FIG. 11 is an elevational view, partly in section, of an ink-containing pen which receives a pressure input during operation that is proportional to the speed of movement of the pen with the pressure input controlling the flow rate of ink from the pen;

FIG. 12 is a transverse sectional view of a shoe, similar to FIG. 4, in which the shoe supports a pressurized tool with a passage through the shoe being used to transmit pressure to the tool, and FIG. 13 is an elevational sectional view through a pressurized tool in which the working member of the tool is a knife blade.

DETAILED DESCRIPTION

Figure 1:
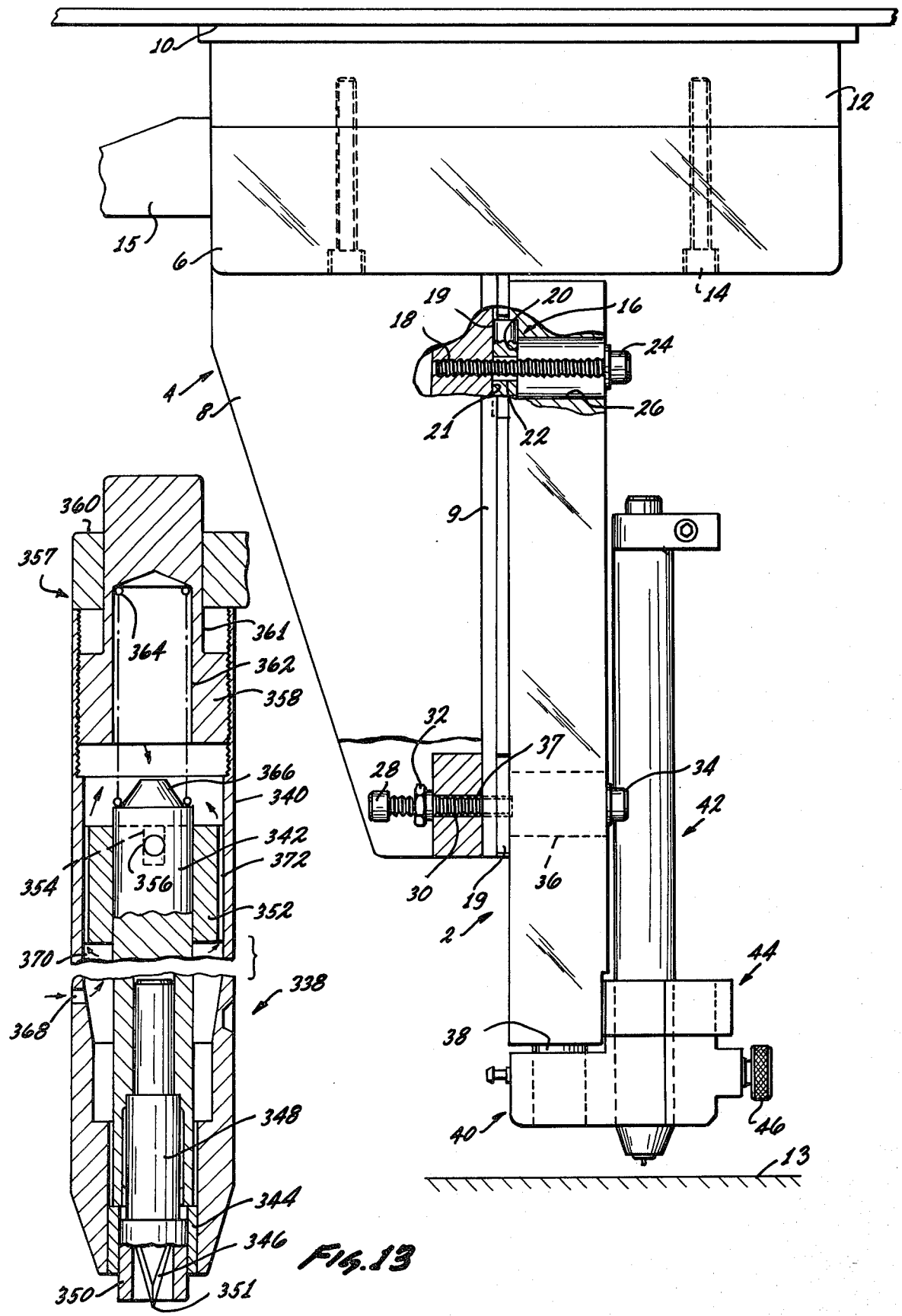
FIG. 1 is a side elevational view, partly in section, illustrating the positioning of a high speed holder and tools supported by the holder with respect to an X-Y forcer which is slidably secured to a platen.
Figure 2:
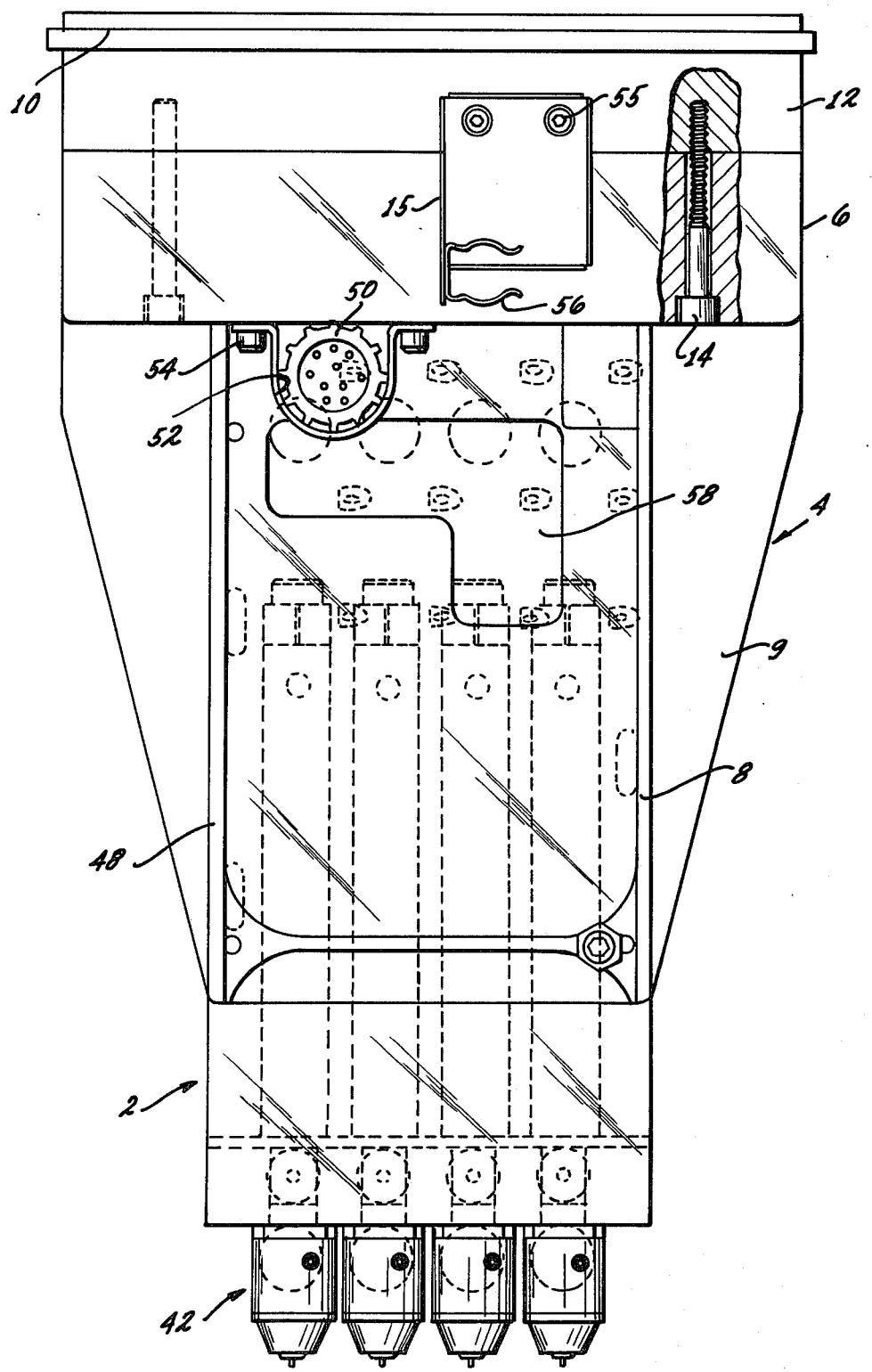
FIG. 2 is a rear view of the rigid support member for mounting the high speed holder on an X-Y forcer as viewed from the left in FIG. 1.

FIGS. 1 and 2 illustrate means to precisely control the positioning of actuatable means relative to a working surface to control the degree of contact of tools with the working surface.

FIG. 1 is a side elevational view of holding means such as a high speed holder 2 illustrating the manner in which the holder is connected to a support bracket 4. The support bracket 4 includes a base plate 6 having a pair of downwardly extending spaced-apart support plates connected thereto-one of which is indicated as 8. Additionally, the spaced-apart support plates are connected to a downwardly extending support plate 9 positioned at substantially a right angle thereto. To provide movement of the high speed holder 2, a flat platen 10 provides support for an X-Y forcer 12 positioned on the underside thereof with an air bearing between the platen and the X-Y forcer.

The combination of an X-Y forcer with a supporting platen to provide accurately controlled movement to a tool carried by the X-Y forcer is not new. Thus, the X-Y forcer 12 will not be described in detail-it being understood that the forcer is of a conventional known construction. The base plate 6 is connected in any suitable manner to the X-Y forcer 12 by the use of screws 14 which threadedly engage apertures in the shell or casing of the forcer. As secured to the X-Y forcer 12, the support bracket 4 then may be accurately moved in any desired direction with respect to a work surface 13. A bracket 15, as described in more detail hereinafter, may be connected to the base plate 6 and X-Y forcer 12 to support wires which lead to mechanism within the high speed holder 2.

As illustrated, the support bracket 4 is quite rigid and provides very firm support for the high speed holder 2. In positioning the holder 2 with respect to the support bracket 4, a pair of vertically aligned hinges may be employed with one of the hinges being indicated generally as 16. The hinges 16 each include a threaded hole 18 in the support plate 9 and a cylindrical dowel pin 19 which is mounted between the support plate and the holder 2 within semi-cylindrical grooves 20 and 21. The dowel pin 19 has a hole 22 therein and a screw 24 passes through the hole to threadedly engage the hole 18. The screw 24 also passes through an oval slot 26 in the holder 2 with the head of the screw engaging an outer surface of the holder to fixedly secure the holder to the support bracket 4.

As stated, two hinges may be used in adjustably securing the holder 2 to the support bracket 4 with the hinges positioned in vertical alignment. An adjustment screw 28 may then be used to vary the rotational position of the holder 2 with respect to support bracket 4 with the adjustment screw being positioned in a transverse direction away from the vertical line through hinges 16. The adjustment screw 28 may be secured within a threaded hole 30 in support bracket 4 with the end of the adjustment screw bearing against a surface of the holder 2. To vary the rotational position of the holder 2, the screws 24 through the hinges 16 may then be slightly loosened with the adjustment screw 28 then being slightly tightened to exert a force against the holder 2. The holder 2, then, undergoes a slight degree of rotation about the vertical line through the hinges 16.

When the holder 2 is rotatably positioned to the desired extent, a lock nut 32 may be tightened to fix the position of the adjustment screw 28. Also, the screws 24 may then be tightened to immobilize the hinges 16. In fixing the position of the holder 2 with respect to support bracket 4, a fixation screw 34 may also be used which passes through an oval slot 36 in the holder and engages a threaded hole 37 in support bracket 4. The fixation screw 34 is preferably positioned closely adjacent to the adjustment screw 28 such that force exerted by the fixation screw on the holder 2 is directed against the end of the adjustment screw in contact with the holder. Further, as illustrated, the hole 37 for the fixation screw 34 may be in substantial horizontal alignment with the hole 30 for the adjustment screw 28 such that the holes 30 and 37 appear as one in FIG. 1.

The oval slots 26 for screws 24 and the oval slot 36 for fixation screw 34 permit the vertical adjustment of holder 2 with respect to support bracket 4. In vertically adjusting the holder 2, the screws 24 and the screw 34 may be loosened and the holder may then be slid upwardly with respect to the support bracket 4. Following this, screws 24 and screw 34 may be tightened so as to fix the vertical position of the holder 2 with respect to support bracket 4.

In providing for vertical adjustment of the holder 2, the semi-spherical grooves 20 in the holder may have a length which is greater than that of the dowel pins 19. Accordingly, as the holder 2 is moved upwardly with respect to support bracket 4, the semi-spherical grooves 20 may undergo movement with respect to the dowel pins 19 at the hinges 16. As will be described, the base plate 6 contains an opening (not shown in FIG. 1) which is positioned above the holder 2. Thus, as holder 2 is moved upwardly, the upper end of the holder may enter the opening within the base plate 6 to provide a greater range of upward movement to the holder without interference from the base plate.

With the holder 2 adjusted to a desired position, both vertically and rotationally with respect to support bracket 4, a plurality of mechanisms within the holder 2 may then be actuated to bring tools which are carried by the holder into contact with the work surface 13. These tools may be of various types such as, for example, a ball point pen, a pressurized ball point pen, a pen which contains liquid ink, a ruby cutter, or a scriber. In general, the tools carried by the high speed holder 2 may be used in making precision drawings on a sheet mounted on the work surface 13. Drawings may be formed by marking on a sheet of paper through use of a ball point pen or a fluid ink marking pen.

Also, drawings may be formed on a flat sheet of Mylar having a ruby coating thereon of about one mil in thickness. A ruby cutter supported by the high speed holder 2 may be used to form cuts in the thin ruby coating such that the ruby coating may be removed from the Mylar surface along the cut lines. The drawing that is formed then provides great color contrast between the clear transparent areas where the ruby coating has been removed and the balance of the sheet which is covered by the reddish-colored ruby coating. Additionally, the scriber tool, which is in the form of a point as contrasted to a cutting knife in the ruby cutter, may be used to form line drawings on Mylar that is covered by a ruby coating. The portions of the Mylar surface which are contacted by the scriber will then have a light coloration which contrasts in color with the reddish coloration of the ruby coating.

As shown in FIG. 1, an axially movable shaft 38 which may be one of several shafts carried within the high speed holder 2 projects downwardly from the holder with the end of the shaft being engaged by actuatable means such as a shoe generally designated 40. A tool generally designated 42 may be supported by the shoe 40 with the position of the tool relative to the shoe being controllable by an adjusting screw 46 and a theta bar 44 that is connected to holder 2 and guides the movement of the shoe in a vertical direction.

FIG. 2 is a rear elevational view of the support bracket 4 as viewed from the left in FIG. 1, to illustrate further structural details of the support bracket and the manner in which it functions to provide rigidity in support of the high speed holder 2. The support bracket 4 may include a downwardly extending support plate 48 which may be generally parallel to the support plate 8. Both support plates 8 and 48 are rigidly connected to support plate 9 which is generally transverse to the plates 8 and 48. The plates 8, 9 and 48 form, with the base plate 6, a very rigid structure for supporting the high speed holder 2. An electrical connector 50 which may be used to supply power to mechanisms within the high speed holder 2 may be secured in position by a support clip 52 mounted on the base plate 6 through any suitable means such as screws 54.

Additionally, the bracket 15 may be mounted on the forcer 12 through use of screws 55 with the bracket including a wire clip 56 having two spaced-apart resilient arms for supporting wires to operate the forcer 12 or mechanisms positioned within high speed holder 2. An opening 58 may also be formed in the support plate 9 adjacent to the high speed holder 2. The opening 58 provides access to the high speed holder 2 from the rear side of the support bracket 4 as may be required for access of electrical wiring, air conduits and the like, leading to mechanisms within the high speed holder.

Figure 3:
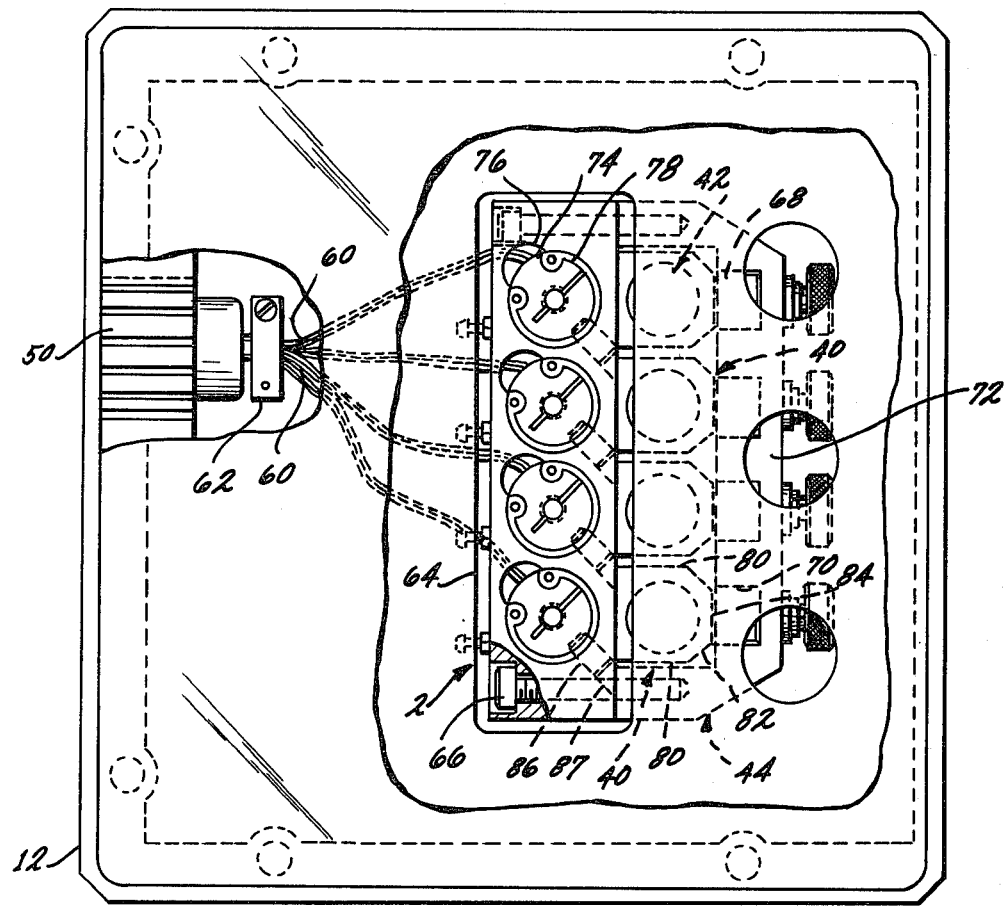
FIG. 3 is a top view of the casing for the X-Y forcer as shown in FIG. 1 with portions being broken away to illustrate the structural details of the high speed holder and the manner in which a plurality of tools is supported by the holder.

FIG. 3 is a top view looking downwardly at the forcer 12 with portions of the forcer being broken away to illustrate details of the high speed holder 2. Solenoid wires 60 may lead from the electrical connector 50 to a plurality of solenoids positioned within the high speed holder 2. The wires 60 may be supported by a bracket 62 which, together with support clip 52, supports the electrical connector 50 and wires with respect to support bracket 4. To accommodate vertical positioning of the high speed holder 2, an opening 64 may be formed in the base plate 6 above the holder. The high speed holder 2 may then be moved upwardly into the opening 64 during its vertical adjustment. The theta bar 44, as illustrated, may be secured to the high speed holder 2 by screws 66 with the theta bar including a plurality of evenly spaced openings 68 which are separated from each other by a plurality of teeth 70 extending from a support member 72 running across the front of the theta bar.

As illustrated, high speed holder 2 may contain a plurality of longitudinal bores 74 formed therein with each bore having a wire opening 76 adjacent the upper opening into the bore to receive wires 60 leading to an electrically operated mechanism within the bore. Additionally, arcuate retainer plates 78 may be positioned at the upper openings into the bores 74 to partially close the upper openings.

As illustrated, the number of individually actuatable means such as shoes 40 correspond in number with the number of such means positioned within the high speed holder 2 with each shoe functioning to connect such means within a bore 74 with a tool 42 such that the tool moves in response to the movement of such means within the bore. The movement of several tools 42 may be coordinated by the theta bar 44 which is connected with each of the shoes 40. As shown, each shoe 40 includes a pair of side surfaces 80 and a pair of tapered surfaces 82 which lead to an end surface 84. Also, a plurality of set screws 86 are positioned within a plurality of openings 87 which are formed in the high speed holder 2 and lead into the bores 74. As will be described, the function of the set screws 86 is to fix the position of a screw assembly within each of the bores 74.

Figure 4:
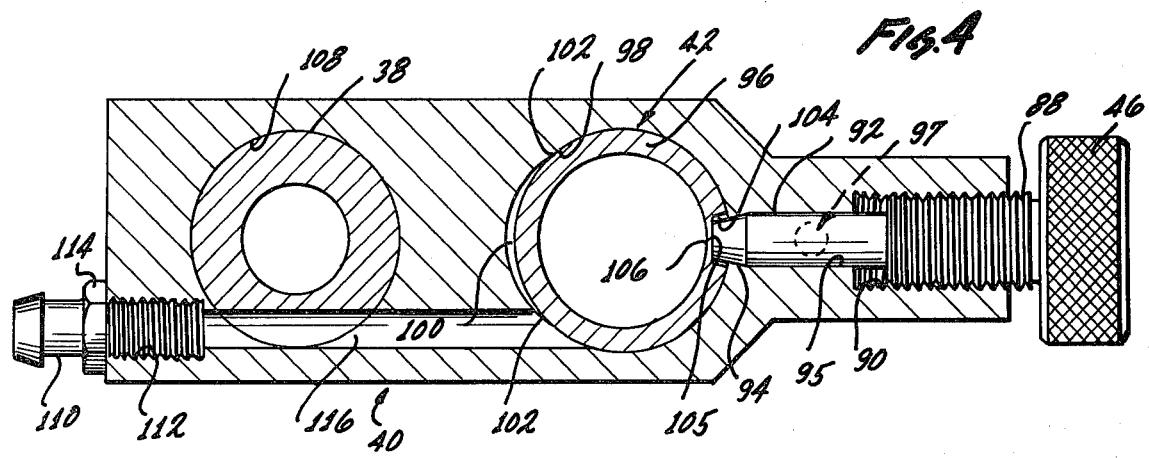
FIG. 4 is a transverse sectional view of a shoe which interconnects a mechanism within the high speed holder with a tool with the tool being moved relative to a working surface by the mechanism.

FIG. 4 illustrates means for precisely positioning each of the tools with respect to the associated actuatable means which moves the tool into contact with the working surface.

FIG. 4 is a transverse sectional view through the shoe 40, as shown in FIG. 1, and demonstrates the manner in which the shoe controllably interconnects the movement of the shoe within the high speed holder 2 with a tool 42 carried by the shoe. As shown in FIG. 1, a shaft 38 may project downwardly from each of the bores 74 (FIG. 3) within the high speed holder 2. The shaft 38 is movable in an axial direction by the mechanism within a particular bore 74 to impart movement to the shoe 40 that is associated with the particular shaft. Further, each of the tools 42 is positioned within a particular shoe 40 by a set screw 46.

Each set screw 46 includes a threaded shank 88 which is threadedly connected with a threaded bore 90 formed in the shoe 40. Additionally, each set screw 46 includes a smoth plunger 92 having a smaller diameter than the shank 88. Plunger 92 terminates in a frustroconically shaped nose 94 with the plunger being accurately positioned within a smooth bore 95 by a centering mechanism 97. The tool 42 includes a cylindrical body 96 which is received within a bore 98 formed in the shoe 40. The bore 98 includes a relieved portion 100 which merges with the otherwise circular bore 98 at two points which are indicated as 102. The frustro-conical nose 94 of adjusting screw 46 engages a frustro-conical indent 104 having tapered sidewalls which lead to a surface 105 having the same shape and dimension as an end surface 106 on the adjusting screw. With end surface 106 in engagement with the surface 105, the cylindrical body 96 is supported very accurately by means providing a three-point suspension system composed of the surface 105 and the two points 102.

The downwardly extending shaft 38 from a mechanism within one of the bores 74 in high speed holder 2 is press fitted within a bore 108 in shoe 40 with the shoe being fixedly connected to the shaft. An inlet fitting 110 is secured within a threaded aperture 112 in shoe 40 and is retained therein by a lock nut 114. The aperture 112 leads to a passage 116 which terminates at the bore 98. By means of the passage 116, either pressure or vacuum may be communicated to a tool 42 held by the shoe 40 as will be described.

In certain embodiments of my invention, tools 42 are operated in part through a pressurized system in which either pressure or vacuum is communicated with the tool through passage 116. This results in varying the force which the tool may apply against a working surface in response to the speed of movement of the tool relative to the working surface. Also, this may result in controlling the flow of ink from a tool with respect to a working surface in response to the speed of movement of the tool with respect to the working surface.

However, in other embodiments of my invention, tools 42 are operated without recourse to a pressurized system. In this case, the passage 116 is not used and the passage and the fitting 110, etc., may be eliminated from the shoe 40. However, to make the shoe 40 more versatile and capable of use with either a pressurized or non-pressurized tool, it is preferable that the shoe contain the passage 116 and the structure associated therewith.

FIG. 5 illustrates means operatively associated with the actuatable means in the plurality for individually actuating the actuatable means to bring the associated tools into operative relationship with the working surface.

FIG. 5 is a vertical side sectional view through the high speed holder 2 illustrated in FIG. 1, with the sectional cutting plane passing through one of the bores 74 as shown in FIG. 3. The purpose of FIG. 5 is to illustrate the mechanism which may be contained within each of the bores 74 in the high speed holder 2. As shown, the bore 74 contains a solenoid 118 having a winding 120 and an armature 122. A screw assembly 124 is positioned within the bore 74 above the solenoid 118 with the screw assembly serving to accurately control the extent of downward movement imparted to shaft 38 by the solenoid 118. The screw assembly 124 includes a base portion 126 with an outer cylindrical surface which fits snugly within the bore 74 with the retainer plate 78 in snap-fitting engagement with a groove in the bore positioned above the base portion. Adjustable means such as a screw 128 threadedly engages a threaded aperture in the base portion 126 and a knob 130 having indexing lines 131 thereon is joined to the screw. Adjustable means such as a stop 132 is affixed to the lower surface of knob 130 such that the position of the stop may be very accurately determined by turning the knob to a desired position as determined by the indexing lines 131. A pin 134 is connected to solenoid armature 122 and projects downwardly therefrom such that downward movement of the armature produces a downward movement of the pin. The pin 134 includes an enlarged diameter portion 136 which is joined to a collar 138. A solenoid positioning spring 140 is positioned about the pin 134 with the spring being compressed between the upper surface of the collar and the lower surface of the solenoid 118. Biasing means such as a hole 139 through the wall of the high speed holder 2 is positioned adjacent the collar 138. Thus, during the assembly of the mechanism within the bore 74, a pin (not shown) may be inserted through the hole 139, through a hole in the collar and into a corresponding hole in the enlarged diameter portion 136 to secure the collar to the enlarged diameter portion.

A bushing 142 is press fitted within the bore 74 with the bushing surrounding the shaft 38 which is joined at its upper end to the enlarged diameter portion 136. Biasing means such as a shaft return spring 144 surrounds the shaft 38 and the shaft return spring is compressed between the lower surface of collar 138 and the upper surface of bushing 142. As will be described, the function of the return spring 144 is to return the shaft 38, collar 138, enlarged diameter portion 136 and pin 134 to a raised position when the solenoid 118 is deactivated. A bushing 146 is also positioned within bore 74 at its lower end with the bushings 146 and 142 guiding the vertical movement of shaft 38 within the bore. As previously described, the lower end of shaft 38 is press fitted within bore 108 in shoe 40 such that the downward movement of the shaft 38 causes a corresponding downward movement of the shoe and the tool 42 which is carried thereby.

In the assembly of the mechanism within the bore 74, the theta bar 44 may first be mounted on the high speed holder 2 through use of the screws 66 as illustrated in FIG. 3. Thereafter, a shoe 40 having a shaft 38 in press fitting engagement within bore 108 may be moved upwardly relative to the high speed holder 2 to insert the shaft through the bearings 146 and 142 and into the bore 74. While this is being accomplished, the shoe 40 is engaged with the theta bar 44 in a manner to be described. After slipping the shaft 38 into bore 74, the shaft return spring 144 may then be slipped about the shaft - it being understood that the shaft, the enlarged portion 136 and the pin 134 may be integrally joined together. Following this, the collar 138 is slipped over the shaft 38 and is moved downwardly against the return spring 144 until the hole in the collar is in alignment with the hole in the enlarged portion 136 and also in alignment with hole 39. At this point, a pin (not shown) may then be inserted through hole 139, into the hole in the collar 138 and into the hole in the enlarged portion 136. This fixedly positions the collar 138 with respect to the enlarged portion 136.

Following this, the solenoid positioning spring 140 may be slipped over the pin 134 and the solenoid 118 may be inserted into the upper end of bore 74 and moved downwardly until the pin 134 is in engagement with the solenoid armature 122. The screw assembly 124 is then inserted into the upper end of bore 74 with a lubricant on the exterior surface of base portion 126 to facilitate movement of the screw assembly within the bore. After this, the retaining plate 78 may be snapped into place within the groove in bore 74 and the position of the screw assembly 124 may then be fixed in its desired position by tightening the set screw 86, as illustrated in FIG. 3, which bears against the exterior surface of base portion 126.

In adjusting the downward movement of the tool 42 with respect to a working surface, the knob 130 may be turned manually through a hole (not shown) in the holder 2 which is positioned adjacent thereto. The knob 130 may be turned to move the stop 132 against the solenoid 118 to move the armature 122 and the shaft 38 and pin 134 connected thereto downwardly to the greatest extent permitted by movement of the armature, i.e., with the armature bottomed within the solenoid 118. The solenoid 118 together with the shaft 38, etc., are moved downwardly within bore 74 as screw 128 is unthreaded from the base portion 126 due to rotation of the knob 130.

When shaft 38 and the tool 42 have, thus, been moved downwardly to bring the tool into contact with the working surface to whatever extent is desired, i.e., to whatever the desired force that the tool exert against the working surface, the knob 124 is then rotated in the opposite direction to thread the screw 128 into the threaded hole within base portion 126. Rethreading of screw 128 into the hole in base portion 126 is continued until the stop 132 has been moved upwardly to whatever extent is desired in limiting the upward throw of the solenoid 118. Following this, the extent of vertical upward movement of the shaft 38 on deactivation of the solenoid 118 is fixed with the upper position of the shaft being determined by the position of stop 132 which bears against armature 122 with the solenoid deactivated.

When the solenoid 118 is, then, activated, the armature 122 moves downwardly away from the stop 132 to the extent permitted by the original setting to bring the tool 142 into contact with the working surface with the desired degree of force. As shown, the springs 140 and 144 work counter to each other; however, spring 144 is considerably stronger than spring 140. Thus, the spring 144 overpowers the spring 140 during the return of the shaft 38, etc., to its raised position when the solenoid 118 is deactivated. The function of spring 140 is merely to maintain the solenoid 118 in its raised position against the stop 132.

As previously described, the solenoid 118 is inserted into the upper end of the bore 74. During its insertion, the solenoid 118 does not have wires connected to it since the wires would interfere with the insertion. However, after insertion, the wires 60 may be soldered to the solenoid 118 by inserting the wires through a hole 147 which is positioned adjacent the solenoid after its insertion into bore 74.

As stated, the shoes 40 are coordinated in their movements by the theta bar 44. The theta bar 44 is fixedly positioned relative to the high speed holder 2. Thus, neither the high speed holder 2 nor the theta bar 44 undergo vertical movement during use of the tool 42. However, the shoes 40 undergo vertical movement resulting from vertical movement of the shafts 38 which are each connected to a shoe. In contacting the shoes 40 with the theta bar 44, an upstanding clevis 148 is formed at the forward end of each of the shoes with spaced-apart arms 150 having a pin 152 therebetween and a ball bearing 154 mounted on the pin.

Turning to FIG. 6, which is a sectional view taken along line 6—6 of FIG. 5, the ball bearings 154 on each shoe 40 are retained between sidewalls 156 of the openings 68 in theta bar 44. During the vertical movement of a shoe 40 with respect to the theta bar 44, the vertical movement of the shoe and the tool 42 supported thereby is, thus, guided by contact between the ball bearing 154 and sidewalls 156. The exterior configuration of the tool 42 includes an enlarged diameter portion 158 which is formed integrally with the cylindrical body 96 to provide a step 159 between the enlarged diameter portion and the cylindrical body that rests on a ledge 160 on the upper surface of shoe 40. Additionally, in positioning the tool 42 with respect to shoe 40, the cylindrical body 96 is held through a three-point suspension, as described in FIG. 4, by contact of the two points 102 with the exterior surface of the cylindrical body and also by the contact of end surface 106 of the adjusting screw 46 with the surface 105.

As previously described, it is very important that the smooth plunger 92 of the adjusting screw 46 be precisely positioned within the smooth bore 95. Rather than to attempt great accuracy in positioning of the plunger 92 within bore 95 by control of the dimensional accuracy of the plunger and bore, I have utilized a centering mechanism 97 for this purpose which is disclosed in detail in FIG. 6. The centering mechanism 97 includes a screw 162 which threadedly engages an aperture 164 in the shoe 40. The aperture 164 extends very slightly into the bore 95 which contains smooth plunger 92. An axial bore 166 is formed in screw 162 with a spring 168 within the axial bore and a spherical ball 170 within the axial bore at its leading end. As illustrated, when screw 162 is threaded into aperture 164, the spherical ball 170 is pressed into point contact with the lower surface of the smooth plunger 92 through the action of spring 168. This insures that the smooth plunger 92 is pressed against the upper surface of the bore 95. Thus, even though the dimensions of the smooth plunger 92 may differ somewhat from those of the smooth bore 95, the plunger is, at all times, very accurately positioned against the upper surface of the bore.

Up to this point, the tools which may be carried by the high speed holder 2 have been referred to in a general sense by reference numeral 42. However, as described previously, these tools may encompass a variety of individual tools ranging from a ball point pen or an ink-fed pen to a ruby cutter or a scriber.

FIG. 7 is a partial vertical sectional view through one of the tools which may be utilized with the present invention which is an ink-fed pen 172 having a barrel 173 with a bore 174 formed therein. A reservoir 176 is positioned within the bore 174 with the reservoir having a stub shaft 178 at its upper end. An insert 180 is press fitted within the interior of the reservoir 176 to define a lower opening which is smaller than the normal internal diameter of the reservoir. A capillary tube 182 is then positioned within the reservoir 176 with the capillary tube extending through the insert 180 and having a cut-away center portion 184. A point assembly 186 includes an outwardly projecting shaft 188 and a pen point 190 formed at the end thereof. The shaft 188 is joined to a barrel 192 having threads 194 on the upper portion thereof which engage corresponding threads on the inner surface of the reservoir 176. The pen shaft 188 is retained within a reduced bore 196 at the lower end of the pen 172 with a bushing 198 mounted therein. Bushing 198 has an inner surface which is accurately dimensioned to conform with the outer surface of the shaft 188. However, the height of the bushing 198 is relatively shallow so that slight inaccuracies in the dimensions of the reservoir 176 or in the stub shaft 178 can be accommodated by a slight tilting of the reservoir within the barrel 173 while still accurately positioning the pen shaft 188 within the bushing.

In supporting the reservoir 176 and pen assembly 186 within the barrel 173, biasing means such as a spring 200 is positioned between the bushing 198 and the barrel 192. The reservoir 176 and pen assembly 186, thus, in effect, float on the spring 200 so that the pen point 190 can ride smoothly over irregularities in the working surface.

A pin 204 which projects outwardly from the surface of the reservoir 176 engages a positioning slot 202 formed within the wall of the bore 174 to fix the rotational position of the point assembly 186 with respect to the pen 172. In this manner, the position of the pen point 190 is fixed with respect to the pen 172. The fixing of the pen point 190 in the same position each time with respect to the pen 172 is desirable since the markings or lines made by the pen point may vary from time to time if the rotational position of the pen point is varied with respect to the pen. Accordingly, when the reservoir 176 is removed to refill the reservoir with ink, the position of the pen point 190 is maintained relatively constant when the filled reservoir is reinserted into the barrel 173 for further use of the pen 172.

A preload spring 206 is positioned about the shaft 178 at the upper end of the pen 172 with the preload spring being compressed by a screw assembly 208 to exert a predetermined downward force against the upper surface of the reservoir 176 and from thence to the pen point 190. During usage of the pen 172, when the point 190 encounters a working surface, the pen point is pushed upwardly against the force of biasing means such as the preload spring 206. Accordingly, the downward force which is asserted by the preload spring 206 determines the force which may be applied against the working surface by the pen point 190.

The screw assembly 208 includes a cylinder 210 which is connected to a screw member 212 that threadedly engages internal threads formed in the bore 174. The screw member 212 has a spring annulus 214 which is shaped to receive the upper end of preload spring 206. Additionally, a handle 216 is connected to the cylinder 210 with turning of the handle imparting rotational movement to screw member 212 to either thread or unthread the screw member with respect to the internal threads formed in the bore 174. This, in turn, either increases or decreases the compressive force which is exerted by the preload spring 206 against the upper surface of the reservoir 176. The handle 216 may be clamped to the cylinder 210 by any convenient means such as a nut and bolt 218 with the radially outwardly extending portion of the handle serving as a pointer 220. Circumferentially spaced lines may then be scribed on the exterior surface of the barrel 173 at a point adjacent to the handle 216 with the relative position of the pointer 220 with respect to the scribed lines indicating the compressional force which is exerted by the preload spring 206. In this manner, when the reservoir 176 is removed from the barrel 173 for refilling, the preload spring 206 may be accurately readjusted to the proper compressive force on insertion of the reservoir into the barrel by positioning the pointer 220 with respect to the scribed lines on the exterior surface of the barrel 173.

As ink is discharged from the reservoir 176 through the pen point 190, air is permitted to enter the reservoir through means such as an air hole 222. This insures that the pressure within the reservoir 176 remains at atmospheric during the discharge of ink from the pen 172.

FIG. 7a, which is an enlarged vertical sectional view of the lower end of the pen 172, illustrates the manner in which ink flows from the pen reservoir 176 during usage of the pen. As shown, the lower end of the capillary tube 182 is received within a central aperture 175 in the point assembly 186. Additionally, the end of the capillary tube 182 abuts against an aperture 177 which leads through the shaft 188 to the point 190. The aperture 175 and aperture 177 are interconnected by a conical base portion 179 which snugly receives the end of the capillary tube 182 such that ink flows smoothly from the capillary tube into the aperture 177 without leakage. The insert 180 within the reservoir 176 includes an enlarged diameter portion 181 which is press fitted within the bore 176 such that the insert and the reservoir form a unitary structure. Ink 183 which is contained within the reservoir 176, thus, flows downwardly through the capillary tube 182 to the pen point 190 in the manner described.

Additionally, ink within the reservoir 176 moves downwardly to a limited extent through an annulus 185 formed between the exterior surface of the capillary tube 182 and the interior surface of the insert 180. However, due to the relatively small radial dimension of the annulus 185, the capillary attraction between the ink 183 and the surfaces which define the annulus maintain a standing column of ink within the annulus such that the ink does not flow through the annulus. Air which enters the opening 222 flows through a second opening 187 in the pen assembly 186 into the region beneath the open end of the annulus 185 as indicated by the arrows in FIG. 7a. The entering air may then flow upwardly through the annulus 185 and the standing column of ink therein to maintain atmospheric pressure within the reservoir 176 and to insure that ink flow to the pen point 190 is unimpeded.

As further illustrated in FIG. 7a, the bushing 198 has a bearing surface 199 thereon which is relatively shallow in its linear dimension as measured along the axis of the pen 172. By virtue of the relatively shallow linear dimension of the bearing surface 199, the bearing surface accurately positions the point assembly 186 while, at the same time, permitting minor tilting of the reservoir 176 with respect to the pen barrel 173. This permits accurate positioning of the point assembly 186 without interference due to minor inaccuracies in the components of the pen which are contained within the barrel 173, such as the reservoir 176, the shaft 178, etc.

As described previously, the present invention is directed to a high speed holder, such as the holder 2, and to tools generally indicated by reference numeral 42 which may be either non-pressurized or pressurized. To this point, the discussion of the tools 42 has been directed to non-pressurized tools such as the pen 172 described in FIGS. 7 and 7a. In using non-pressurized tools, the tools receive a resilient downwardly biasing force from a preload spring, such as the spring 206 shown in FIG. 7. Further, in the case of the non-pressurized pen 172 shown in FIGS. 7 and 7a, the pen reservoir 176 and the point assembly 186 joined thereto may be resiliently supported by the spring 200 such that the pen reservoir and the point assembly are, in effect, floating since they are resiliently supported from above and from below by the springs 206 and 200.

In the embodiments of the present invention which are directed to the use of pressurized tools, FIG. 8 illustrates a schematic flow diagram for tools which are pressurized. As illustrated, a vacuum line 224 may be branched to supply two separate lines 226 and 228 which serve as vacuum sources in evacuating either the upper or the lower portion of the pressurized tools in a manner to be described. Turning to line 228, this line may be fed to a regulator 230 while line 226 may be fed to a regulator 232. Additionally, an air pressure line 234 may be fed to a regulator 236 to serve as a pressure source for the pressurized tools. A vacuum line 238 exits from the regulator 230 with the line 238 being fed to lines 244, 246, 248 and 250 which may be arranged in parallel and lead respectively to solenoid operated valves 252, 254, 256 and 258. The vacuum outlets from the solenoid operated valves 252, 254, 256 and 258 then lead respectively to the upper portions of tools designated 260, 262, 264 and 266.

In the use of pressurized tools one such pressurized tool may be a pen having a source of liquid ink therein. When the pressurized ink-containing pen is at rest, as will be described, there may be a tendency for ink to drip from the pen point. To prevent this result, it is desirable to impose a vacuum above the ink level within the pen with the vacuum serving to prevent flow of ink through the pen point. Accordingly, when tools 260, 262, 264 and 266 are ink-containing pens, the solenoid valves 252, 254, 256 and 258 may be opened when the pens are not in use. This will result in the transmission of a vacuum from line 238 to the tools 260, 262, 264 and 266 to impose a vacuum above the ink levels within the respective pens and to prevent the dripping of ink from the pen points.

In the embodiments of my invention in which the tools are pressurized, the tools may receive a pressure which is varied in response to the speed of movement of the tools. Thus, when the tools are moved rapidly with respect to a working surface, the pressure input to the tools may be increased with the increased pressure input serving to impart a larger downward force to the tools, in addition to the downward force that may be imparted by resilient preloading springs. The increased downward force applied to the tools, thereby, serves to hold the tools in contact with the working surface. This is highly advantageous since the tools, when moved at a high rate of speed with respect to the working surface, will have a greater tendency to move upwardly away from the working surface due to the resistance from the working surface that is encountered by the tools at higher speeds. For example, when the tool is a ruby cutter or a scriber, as described, a larger resistance from the working surface which is encountered by the tool at a higher speed will provide an upward force component that will tend to raise the tool out of contact with the working surface. However, by increasing the downward force of the tool against the working surface in response to the increased speed of movement of the tool with respect to the surface, the increased upward force supplied to the tool by the working surface will be counterbalanced by an increased downward force tending to hold the tool in contact with the surface.

In providing means producing a pressure for the flow of fluid, such as a pressure input to the tools designated 260, 262, 264 and 266 in FIG. 8, a pressure line 240 leading from regulator 236, and means inhibiting the flow of fluid, such as a vacuum line 242 leading from the regulator 232, are both directed to variable means, such as a transducer generally designated as 268, which functions to vary the pressure input to the tools in response to the speed of movement of the tools. As indicated, the transducer 268 may be connected to output lines 270, 272, 274 and 276 which lead respectively to solenoid operated valves 278, 280, 282 and 284. The valves 278, 280, 282 and 284, as in the case of valves 252, 254, 256 and 258, may be actuated in unison or may be separately actuated so that the tools 260, 262, 264 and 266 may be operated in unison or may be operated separately. For example, assuming that the respective tools 260, 262, 264 and 266 are a ruby cutter, a scriber, a ball point pen and an ink-fed pen, the particular working operation may only require the use of the ruby cutter. In this instance, the other tools which are not in use may be inactivated with no pressure input being fed to these tools while the ink-fed pen receives a vacuum input directed to the upper portion of the pen to prevent the leakage of ink from the pen point.

In the case where the tools 260, 262, 264 and 266 are operated in unison, all of the tools may, for example, be ink-fed pens with each of the pens containing a different colored ink. In this instance, a pressure input may be supplied to each of the pens such that the downward force of the pen points against the working surface is increased in response to the speed of movement of the pens with respect to the working surface.

FIG. 9 is an elevational view, partly in section, which illustrates a transducer that may be employed in the flow arrangement described in FIG. 8. As illustrated, a stepping motor 286 receives power through a wire 288 with the motor having an output shaft 290 directed to a valve plate shown in section as 292. The lower surface of the valve plate 292 bears against the open ends of pressure line 240 and vacuum line 242 with the valve plate having a cam-like configuration. The cam-like configuration of the valve plate 292 permits an infinite variation in the blend of pressure introduced through line 240 and vacuum introduced through line 242 into the interior of the transducer 268. As shown in FIG. 9, the valve plate 292 completely covers the open end of pressure inlet 240 and completely uncovers the open end of vacuum inlet 242. However, when the shaft 290 is rotated 180 degrees from its position shown in FIG. 9, the situation is reversed, i.e., the open end of pressure inlet 240 is completely uncovered while the open end of vacuum inlet 242 is completely covered. At intermediate rotational positions, the open end of pressure inlet 240 is partially covered and the open end of vacuum inlet 242 is partially covered to provide a pressure within the transducer 268 which is intermediate to the pressure in line 240 and the vacuum in line 242. Since the degree to which the open end of the pressure inlet 240 is covered or uncovered and the degree to which the open end of vacuum inlet 242 is covered or uncovered will vary with the rotational position of valve plate 292, an infinite range of adjustment is possible between the pressure in line 240 and the vacuum in line 242.

As illustrated in FIG. 9, the transducer 268 may include the direct vacuum line 238 having side leads therefrom, as illustrated in FIG. 8, which are lines 244, 246, 248 and 250. In this manner, the transducer 268 may also serve as a vacuum manifold in directing vacuum from line 238 to the upper portions of the tools 260, 262, 264 and 266 while also serving as a means for varying the pressure which is fed to the lower portions of the tools through lines 270, 272, 274 and 276.

In controlling the position of valve plate 292, the motor shaft 290 may extend upwardly in a direction away from the transducer 268 with the upwardly extending portion of the motor shaft cooperating with an optical switch 294 which defines an optical gap 295. A shutter member 296 may be positioned on the upwardly extending portion of the motor shaft 290 with the shutter member having the same general configuration as the valve plate 292. As shown, with the valve plate 292 positioned to extend further to the left than to the right to cover the open end of air inlet 240 and to uncover the open end of vacuum inlet 242, the shutter member 296 may also be positioned to extend further to the left to correspond with the position of the valve plate. Line 298 may be an electrical input to a light-emitting diode while line 299 may be an electrical output from a transistor. Accordingly, the input of electricity through line 298 may cause the diode to emit light which is then received or is not received by the transistor on the other side of the optical gap 295 depending upon the position of shutter member 296. When light is permitted to cross the optical gap 295 from the light-emitting diode to the transistor, an output current is generated in the line 299 which indicates that the optical gap is not blocked by the shutter member 296, thereby indicating the position of valve plate 292 within the transducer 268.

As indicated, the transducer 268, motor 286 and the optical switch 294 may all be mounted on a support member 300 which may conveniently be an exterior surface of the X-Y forcer 12 as illustrated in FIGS. 1 and 2. Mounting may be accomplished, for example, by securing the motor 286 to the support member 300 through use of a motor bracket 301 which clampingly engages the motor and is secured to the support member by screws 302.

FIG. 10 is a bottom view of the transducer 268 as shown in FIG. 9 which illustrates the relative positions of the various lines which lead to and from the transducer in forming a compact structural arrangement. As shown, the vacuum line 238 may be continued into the block of the transducer 268 to form a manifold therein which leads to the various vacuum lines 244, 246, 248 and 250. Additionally, the pressure input line 240 and the vacuum input line 242 may be conveniently spaced on the bottom of the transducer 268 with the spacing depending on the exact configuration of the valve plate 292 which bears against the open ends of the pressure input line and the vacuum input line. The various lines 270, 272, 274 and 276 which lead from the transducer 268 to the various tools may then be conveniently positioned in aligned relation between the pressure input line 240 and the vacuum input line 242.

As described previously in regard to FIGS. 7 and 7a, one of the tools which may be employed in accord with the present invention is a non-pressurized ink-fed pen. To illustrate the contrast between the non-pressurized pen 172 shown in FIGS. 7 and 7a with a pressurized pen, FIG. 11 is a vertical view, partly in section, of a pressurized ink-fed marking pen generally indicated as 304. The pen 304 has a barrel 306 and a reservoir 308 which is mounted within the barrel. A shaft 310 is formed at the upper end of the reservoir 308 while a pen assembly 312 is threadedly received within the lower end of the reservoir 308. The pen assembly 312 is of a standard configuration and includes a cylindrical 313 which is slidably received within a bushing 314 positioned within an axial opening into the interior of the barrel 306. A pen point 315 extends downwardly from the lower end of the cy7linder 313 and a spring 316 surrounds the cylinder with the lower end of the spring resting on the bushing 314 while the upper end of the spring bears against an enlarged diameter portion 317. A preload spring 318 is positioned about the shaft 310 at the upper end of the reservoir 308 and a positioning slot 320 formed on the interior of the barrel 308 receives a pin 322 which projects outwardly from the surface of the reservoir.

As in the case of the non-pressurized pen 172 described in FIG. 7, the function of the positioning slot 320 and the pin 322 is to control the rotational position of the reservoir 308, the pen assembly 312, and the pen point 315 with respect to the barrel 306. In this manner, the position of the pen point 315 is always the same in terms of its relation to the barrel 306. Moreover, since the rotational position of the barrel 306 is fixed by means of a conical indent 323 that is similar in function to the indent 104 described in FIG. 7, the position of the pen point 315 is consistently positioned with respect to the direction of movement of the pen 304 such that lines drawn by the point are relatively uniform and are not varied due to variations in the relative position of the pen point and the pen.

A screw assembly 324 is accurately positioned at the upper end of the pen 304 in the same manner as the screw assembly 208 described in FIG. 7. The screw assembly 324 includes a screw 325 which threadedly engages an internal thread formed within the barrel 306 and a cylinder 326 which interconnects the screw with a handle 328. As in the case of the screw assembly 208 described in FIG. 7, the handle 328 may be used as a pointer in conjunction with lines which may be scribed circumferentially about the barrel 306 to indicate the relative rotational position of the handle with respect to the barrel. In this manner, the downward preload force exerted by the preload spring 318 may be precisely controlled simply by noting the position of the handle 328 with respect to the barrel 306.

As illustrated in FIG. 11, the reservoir 308, the pen assembly 312 and the pen point 315 float through the action of the lower spring 316 and the upper spring 318. Thus, although there is a downward biasing force exerted by preload spring 318, the pen point 315 still undergoes a floating action such that the pen point may be easily displaced upwardly along with the reservoir 308 to permit the pen point to ride over irregularities in the working surface.

Additionally, the pen 304 includes an inlet opening 330 which leads to an annulus 332 formed between the exterior surface of the reservoir 308 and the interior surface of the barrel 306. A reservoir opening 334 leads from the annulus 332 into the interior of the reservoir 308 such that pressure or vacuum which is introduced into the annulus through opening 330 is communicated through the reservoir opening to exert either a pressure or a vacuum above the ink level within the reservoir. The inlet opening 330 may receive a pressure input that is directly related to the speed of movement of the pen 304 as described in regard to FIGS. 8-10. Thus, as the pen 304 is moved more rapidly with respect to a working surface, the pressure above the ink level within the reservoir 308 may be increased to increase the ink flow from the reservoir through the pen point 315. Additionally, a vacuum opening 336 is formed in the barrel 306 adjacent the upper end of the pen 304. When the pen 304 is not in use, as described previously, the pressure input through the inlet opening 330 may be terminated with a vacuum input being directed to the interior of the pen 304 through the opening 336. This imposes a vacuum above the ink level within the reservoir 308 to prevent undesired leakage of ink from the reservoir through the point 315 when the pen is not in use.

As described previously, a variation in the pressure input transmitted to a pressurized tool in accord with my invention may be used to vary the downward force exerted by the tool against a working surface as a function of the speed of movement of the tool with respect to the working surface. In achieving this function, a shaft portion 335 on the pen assembly 312 has a larger diameter than the diameter of the shaft 310 positioned at the upper end of the reservoir 308. Accordingly, a piston surface 339 formed at the upper end of the pen 304 has a larger area than a piston surface 337 formed at the lower end of the pen. As a result, pressure introduced through the inlet opening 330 exerts a greater force on the piston surface 339 than on the piston surface 337. Thus, an increase in pressure within the pen 304 results in the application of a larger downward force to the pen point 315 with the result that the pen point more easily remains in contact with the working surface when the speed of movement of the pen is increased with respect to the working surface.

FIG. 12 is a transverse sectional view through the shoe 40, similar to FIG. 4, which illustrates the manner in which a pressurized tool, such as the pen 304 of FIG. 11, is supported by the shoe. As illustrated, FIG. 12 is identical to FIG. 4 except for several small changes which relate to the structure of the tool 304 that is supported by the shoe 40. The barrel 306 of the pen 304 is positioned within the bore 98 with the inlet opening 330 in alignment with the passage 116 through the shoe 40. Accordingly, a variation in pressure, which is related to the speed of movement of the tool 304 with respect to a working surface, is transmitted through the passage 116 to the interior of the pen. This may produce a variation in the force which is applied to the working surface that is contacted by the tool in the manner described in FIG. 11 with the increase in force tending to maintain the tool in contact with the working surface at increased speeds.

As described previously, there are a number of tools which may be used in accordance with my invention. These tools may include, for example, a ruby cutter, a scriber, a ball point pen, and an ink-fed pen. In tools which are pressurized, all of the tools may receive a pressure input which functions to increase the downward force applied by the tool against a working surface in resopnse to the speed of movement of the tool relative to the working surface.

FIG. 13 is a vertical partially cross sectioned view of a pressurized ruby cutter 338 of my invention having a body 340 with a shaft 342 positioned centrally within the body. The shaft 342 is slidably positioned within a bushing 344 at the lower end of the body 340 with a blade 346, a blade holder 348, and a blade protector 350 positioned within the bushing. As indicated, the blade protector 350 may be in the form of a cylinder positioned about the blade 346 such that the blade tip 351 extends only slightly beyond the lower edge surface of the blade protector. To provide the blade 346 with a particular orientation, the shaft 346 may be slidably positioned within a blade orientation bushing 352 having a positioning slot 354 therein which receives an orientation pin 356 that extends outwardly from the surface of the shaft 342.

Additionally, a preload screw assembly 357 may be positioned at the upper end of the ruby cutter 338 with the screw assembly functioning in the same manner described previously in exerting a predetermined downward force against the blade 346. The preload screw assembly 357 includes a preload screw 358 which is in threaded engagement with internal threads on the body 340 and a handle 360 which is connected to the preload screw 358 through a cylinder 361. The preload screw assembly 357 includes a bore 362 which receives a spring 364 with the bore, thereby, serving as a spring guide. A frusto-conical piston surface 366 is formed at the upper end of the shaft 342 with the piston surface in engagement with the lower end of the spring 364.

An inlet opening 368 into the body 340 of the ruby cutter 338 permits the transmission of a pressure to the interior of the body which may be varied in relation to the speed of movement of the ruby cutter 338 with respect to a working surface. Accordingly, pressure which is introduced through the inlet opening 368 is transmitted through an annulus 370 and through vertical slots formed in the bushing 352 into the region above the piston surface 366. This is indicated by the arrows in FIG. 13. Pressure introduced above the piston surface 366 may, thus, exert a downward force against the shaft 342 and the blade 346 in addition to the downward force imparted to the shaft and the blade by the preload spring 364. In this manner, as the speed of movement of the ruby cutter 338 is increased with respect to a working surface, the increased resistance of the working surface to the blade movement may be compensated for by increasing the pressure against the piston surface 366. This, then, exerts a greater downward force against the shaft 342 and the cutter 346 such that the cutter has a greater tendency to remain in contact with the working surface as the speed of the cutter is increased.

When several ruby cutters 338 are carried by the high speed holder as illustrated in FIGS. 1 and 2 for operation of the cutters in unison, the orientation of the cutter blades 346 may be varied as among the several cutters. Thus, the blade 346 in one of the cutters 338 may be expressly aligned for making cuts in the direction of the X-axis while another blade is aligned for making cuts along the Y-axis and another blade is aligned for making diagonal cuts that are intermediate to the X and Y axes, etc. Thus, during operation, the specific ruby cutter 338 may be actuated for making a cut in the direction of the X-axis while a different ruby cutter is actuated for making a cut in the direction of the Y-axis, etc.

Similarly, other of the tools used in my invention may be aligned to perform specific functions such as an ink-receiving pen aligned to draw lines in the direction of the X-axis with a different pen being aligned to draw lines in the direction of the Y-axis, etc. In this manner, the movement of the X-Y forcer may be simplified such that the forcer is not required to make extra movements merely to accommodate the positioning of a particular tool at a particular angle, e.g., in the case of a ruby cutter that is used to make a cut along the X-axis at one instant of time and is then used to make a cut along the Y-axis in a following time instant.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. An apparatus for making drawings on a working surface in accordance with the production of individual signals comprising:
    a platen,
    a forcer disposed relative to said platen for movement relative to the platen,
    retaining means adjustably connected to said forcer,
    a plurality of separately actuatable means movable relative to said retaining means in accordance with the actuation of the actuatable means,
    a plurallity of tools each associated with an individual one of the actuatable means for movement with the actuatable means in accordance with the actuation of the actuatable means and each movable independently of the actuatable means,
    said retaining means holding the plurality of separately actuatable means and the plurality of tools for movement of the associated tool into or out of operative relationship with the working surface in accordance with the actuation of the actuatable means,
    a plurality of means each adjustable to control the positioning of an individual one of said actuatable means relative to the working surface in accordance with such adjustments to control the degree of contact of said tools with the working surface,
    means to position each of said tools independently of the positioning of the associated actuatable means,
    means operatively associated with the actuatable means in the plurality and responsive to the production of the individual signals for individually actuating the actuatable means in accordance with the production of such signals to move the actuatable means and bring the associated tools into operative relationship with the working surface, and
    means operatively associated with individual tools in the plurality for providing for each such tool a floating relationship between such tool and the working surface independently of the positioning of the associated actuatable means and independently of the operation of the actuating means in actuating the associated actuatable means.

2. The apparatus of claim 1 including
    means operatively associated with the separately actuatable means and the tools to synchronize the movements of said tools with respect to said retaining means and
    the actuating means for the actuatable means including at least a first spring cooperative with the actuatable means for biasing the actuatable means in a direction away from the working surface and the means providing the floating relationship for each tool including at least a second spring operative independently of the first spring and cooperative with the working tool for biasing the working tool in a direction away from the working surface.

3. The apparatus of claim 1 including
    means operatively associated with each of the tools to vary the degree of contact of said tool with the working surface in response to the speed of movement of said tool along the working surface,
    each of the actuatable means including a first housing, the means for adjustably positioning the actuatable means relative to the working surface being disposed within the first housing and the actuating means for the actuatable means being disposed within the first housing, and
    each of the tools including a second housing displaced from the first housing and the positioning means for the tool being disposed in the second housing and the means providing the floating relationship being disposed within the second housing.

4. The apparatus of claim 3 wherein said means to vary the degree of contact of the tools with the working surface includes
    means to provide a pressure output;
    means to introduce the pressure output to said tools in a direction to press the tools against the working surface;

each of said tools including piston means positioned to receive the pressure output in a direction for pressing the piston against the working surface and for forcing the tool toward the working surface in accordance with the pressure output applied to the piston, and means to vary said pressure output at each instant in response to the speed of the tools at that instant along the working surface to vary the pressure exerted by the tools against the working surface at that instant.

5. The apparatus of claim 2 including
means operatively associated with each of the tools for varying the force exerted at each instant by each of the tools against the working surface in accordance with the speed of movement of the tools at that instant.

6. The apparatus of claim 1 wherein said actuatable means includes
a plurality of shoes each associated with individual ones of said actuatable means and the associated one of said tool and further includes a plurality of shafts each associated with an individual one of said shoes to drive the shoe in accordance with the movement of the shaft and further includes a plurality of energizing means each energizable in accordance with the production of an individual one of the signals and coupled to an individual one of the shafts for moving the shaft relative to the working surface in accordance with the energizing of the energizing means, and guide means fixedly connected to said retaining means and constructed to slideably receive said shoe and to guide said shoe in synchronized paths of movement, the actuating means for the actuatable means including at least a first spring and the means providing the floating relationship for the tool including a second spring independent of the first spring.

7. The apparatus of claim 6 including
an adjusting screw on each of said shoes;
an indent on each of said tools, and
said tools being adjustably positioned with respect to said shoes through engagement of the adjusting screws with said indents, there being, in the shoes, bores each receiving an individual one of the tools, each of the bores being relieved to receive the associated tool at a precise position in the bore with the adjusting screw engaging the detent.

8. The apparatus of claim 1 including
rigid support means interconnecting said forcer with said retaining means, and
means to provide for variations in the position of said retaining means with respect to said rigid support means.

9. In an apparatus for performing a working operation on a working surface in accordance with the production of individual signals,
a platen,
a forcer slidably disposed relative to the platen for movement relative to the platen,
retaining means adjustably connected to said forcer,
a plurality of individually actuatable means each adjustably mounted on the retaining means for adjustable disposition relative to the working surface and for movement relative to the retaining means in a direction toward or away from the working surface in accordance with the actuation of such actuatable means, a plurality of means each operatively associated with an individual one of the actuatable means for biasing the individual one of the actuatable means relative to the retaining means in a direction away from the working surface, a plurality of energizable means each operatively associated with an individual one of the actuatable means for individually actuating the associated actuatable means to provide a movement of the associated actuatable means toward the working surface upon each such actuation, a plurality of tools disposed to perform a working operation on the working surface, means for retaining individual ones of the tools on individual ones of the actuatable means for movement of the individual tools with the associated actuatable means in accordance with the actuation of the associated actuatable means and for movement of the individual tools independently of the movement of the associated actuatable means, and a plurality of means each operatively associated with an individual one of the tools for providing a floating relationship of the individual one of the tools relative to the associated one of the actuatable means and relative to the working surface.

10. The apparatus of claim 9 including,
a plurality of means each operatively associated with an individual one of the tools for providing at each instant against the individual one of the tools, in a direction toward the working surface, a force proportional to the speed of movement of such tool along the working surface, and a plurality of means each operatively associated with an individual one of the actuatable means for providing for an adjustment of the individual one of the actuatable means relative to the retaining means in the direction of the working surface to vary the force exerted by the tool against the working surface when the associated energizable means is energized.

11. The apparatus of claim 9 wherein said tool is an ink-containing pen, and including
means to increase the flow rate of ink from the pen onto the working surface in response to increases in the speed of movement of the pen along the working surface.

12. The apparatus of claim 11 wherein said means to increase the flow rate of ink from the pen includes
means responsive to the movement of the pen along the working surface to produce a force propotential to the speed of movement of the pen along the working surface, and means to transmit such force to the ink within the pen in a direction for providing for a flow of ink from the pen.

13. The apparatus of claim 12 including
means responsive to interruptions in the movement of the pen along the working surface to impose a reduced pressure on the ink within the pen when the pen is not moving,
wherein the flow of ink from the pen is inhibited.

14. An apparatus including a plurality of tools for making drawings on a working surface, comprising:
a platen;

an X-Y forcer associated with said platen for movement relative to the platen;

a high speed holder adjustably connected to said forcer;

said holder including a plurality of separately actuatable means with each of said means being connected to an individual one of the tools in the plurality for movement of the tool into or out of contact with the working surface;

means to control each of said tools to control the degree of contact of said tools with the working surface, and means to position each of said tools with respect to the actuatable means which moves said tool into contact with the working surface, rigid support means interconnecting said forcer with said holder, means to vary the position of said holder with respect to said rigid support means, including, at least a pair of hinges;

said hinges positioned in alignment along a line of alignment;

each of said hinges being movable along said line of alignment on movement of said holder with respect to said rigid support means;

adjustment means positioned between said holder and said rigid support at a point which is displaced laterally from the line of alignment of said hinges, and said adjustment means providing a rotatable force to said holder to adjustably rotate the holder about said hinges and to vary the rotational position of the holder with respect to the rigid support.

15. The apparatus of claim 14 wherein each of said hinges includes:

a cylindrical pin positioned between said retaining means and said rigid support;

semi-cylindrical grooves in said retaining means and said support engaging said pin;

an aperture in said pin;

a connector joining said retaining means and said support and passing through said aperture, and said aperture being larger than said connector to provide clearance between the connector and the aperture, whereby on loosening of the connector, rotation of the retaining means is permitted with respect to the pin to the extent permitted by the clearance between the connector and the aperture.

16. The apparatus of claim 15 wherein the adjustment means comprises a threaded connector positioned to exert a force against said retaining means on rotation of said connector, whereby the retaining means is rotated with respect to the rigid support on said hinges.

17. An apparatus including a plurality of tools for making drawings on a working surface, comprising:

a platen;

an X-Y forcer associated with said platen for movement relative to the platen;

a high speed holder adjustably connected to said forcer;

said holder including a plurality of separately actuable means with each of said adjustable means being connected to an individual one of the tools in the plurality for movement of the tool into or out of contact with the working surface;

means to precisely control each of said actuatable means to control the degree of contact of said associated tool with the working surface, means to precisely position each of said tools with respect to the actuatable means which moves said tool into contact with the working surface, means to vary the degree of contact of said tools with the working surface in response to the speed of movement of said tools with respect to the surface, said means to vary the degree of contact of the tools with the working surface including a mixing valve and further including a vacuum source and a pressure source connected to the mixing valve;

said valve having a valve member which is shaped and positioned to selectably vary the mixture of pressure and vacuum received by the valve in varying the output pressure from the valve;

means to vary the position of the valve member in response to the speed of movement of the tools with respect to the working surface, and said tools each having piston means therein positioned to supply a force to the tool directed toward the working surface, whereby the pressure supplied to the tools by the valve is increased as the speed of the tools with respect to the working surface is increased to increase the degree of contact of the tools with the working surface.

18. An apparatus including a plurality of tools for making drawings on a working surface, comprising:

a platen;

an X-Y forcer connected to said platen for movement relative to the platen;

a highspeed holder adjustably connected to said forcer;

said holder including a plurality of separately actuatable means, each of said means being connected to an individual one of the tools in the plurality for movement of the tool into or out of contact with the working surface;

means to control each of said actuatable means to control the degree of contact of the associated one of said tools with the working surface, means to position each of said tools with respect to the associated one of the actuatable means which moves said tool into contact with the working surface;

means to synchronize the movements of each of said tools with respect to said holder, said means to synchronize the movements of said tools including a plurality of shoes, each of said shoes interconnecting one of said actuatable means with the associated one of said tools and having a hole, means fixedly connected to said holder to slideably receive said shoes and to guide said shoes in synchronized paths of movement;

a plurality of adjusting screws; and means to contact each of the adjusting screws at a position along the length of the screw to precisely position the adjusting screw within the hole in said shoe.

19. In combination for operating upon a working surface in accordance with the production of individual signals, a platen, retaining means, a plurality of actuatable means each individually held by the retaining means for movement relative to the retaining means in a direction toward or away from the working surface in accordance with the actuation of the actuatable means, a plurality of tools each retained by an individual one of the actuatable means for movement with the associated actuatable means in accordance with the actuation of the associated actuatable means and for independent movement relative to the associated actuatable means in a direction toward or away from the working surface, a plurality of means each operatively associated with an individual one of the actuatable means for adjustably biasing the associated actuatable means in the direction away from the working surface, a plurality of means each operatively associated with an individual one of the actuatable means for actuating the individual one of the actuatable means in the direction toward the working surface, a plurality of means each operatively associated with an individual one of the tools and the associated one of the actuatable means for maintaining the individual one of the tools in adjustable relationship to the individual one of the actuatable means, and a plurality of means each operatively associated with an individual one of the actuatable means for providing for the adjustment of the position of the associated actuatable means relative to the working surface in directions other than toward or away from the working surface.

20. The combination set forth in claim 19, including, a plurality of means each operatively associated with an individual one of the tools for providing a floating relationship of the associated tool relative to the actuatable means and the working surface to provide the associated tool with compensations for irregularities in the working surface.

21. The combination set forth in claim 20, including, a plurality of means each operatively associated with an individual one of the actuatable means for providing for an adjustment in the position of the individual one of the actuatable means relative to the retaining means in directions toward and away from the working surface to control the force exerted by the associated tool against the working surface when the associated actuatable means is actuated in the direction toward the working surface.

22. The combination set forth in claim 19, including, a plurality of means each operatively associated with an individual one of the actuatable means for providing for an adjustment in the position of the individual one of the actuatable means relative to the retaining means to control the force exerted by the associated tool against the working surface when the associated actuatable means is actuated in the direction toward the working surface, and a plurality of means each operatively associated with an individual one of the actuatable means for providing for an adjustment in the distance that the individual one of the actuatable means disposes the tools from the working surface when the individual one of the actuatable means is not actuated.

23. The combination set forth in claim 19, including, the retaining means holding the actuatable means in adjustable relationship and retaining the actuatable means for movement in the directions toward and away from the working surface, and means for providing for adjustments in the positioning of the actuatable means relative to the retaining means in a direction toward or away from the working surface and in a rotary direction about an axis substantially parallel to the working surface.

24. The combination set forth in claim 19, including, a reservoir disposed in at least a particular one of the tools and constructed to hold ink, means in the particular tool for introducing air into the particular tool at a position above the reservoir and at a pressure dependent upon the flow of ink from the reservoir for insuring a continuous and controlled flow of ink from the reservoir.

25. The combination set forth in claim 19, including, a reservoir in at least a particular one of the tools for holding ink, means operatively associated with the particular tool for applying a force to the ink in the reservoir, during the disposition of the particular tool on the working surface and the movement of the particular tool relative to the working surface, in a direction to produce a flow of ink from the reservoir, and means operatively associated with the particular tool for applying a force to the ink in the reservoir, during the interruption of the movement of the tool relative to the working surface, in a direction to inhibit the flow of ink from the reservoir.

26. The combination set forth in claim 25, including, means in the particular tool for introducing air into the particular tool at a position above the reservoir in accordance with the flow of ink from the reservoir for insuring a continuous and controlled flow of ink from the reservoir, and means operatively associated with the particular tool for varying at each instant the force applied to the ink in the reservoir, in the direction producing flow of ink from the reservoir, in accordance with the speed at which the tool is moving relative to the working surface at that instant.

27. In combination for operating upon a worksheet disposed upon a working surface in accordance with the production of individual signals, a platen, a forcer movable along the platen, retaining means movable with the forcer, a plurality of actuatable means supported by the retaining means and individually actuatable in directions toward the working surface, a plurality of means each operatively associated with an individual one of the actuatable means for actuating the individual one of the actuatable means in the plurality in the direction toward the working surface, a plurality of means each operatively associated with an individual one of the actuatable means for biasing the individual one of the actuatable means in the direction away from the working surface, a plurality of tools, a plurality of shoes each operatively coupled to an individual one of the actuatable means for movement with the associated actuatable means in the direction toward the working surface in accordance with the actuation of the associated actuatable means, and a plurality of means each operatively coupled to an individual one of the shoes for adjustably supporting an individual one of the tools on an individual one of the shoes to provide for a movement of each tool with the associated one of the shoes independently of any movement of the actuatable means.

28. The combination set forth in claim 27, including,
the adjustable support means for each individual one of the tools on the individual one of the shoes providing a three-point suspension for each tool on the associated shoe to obtain a precise positioning of the tool on the shoe, and
each individual one of the tools being slidable relative to the individual one of the shoes in the direction toward or away from the working surface to control the position of the shoe relative to the working surface when the associated actuatable means is not actuated.

29. The combination set forth in claim 27, including,
a plurality of means each operatively coupled to an individual one of the tools for providing a floating relationship of such individual one of the tools relative to the associated one of the actuatable means and the working surface for facilitating a movement of the tool along the working surface over irregularities on the working surface.

30. The combination set forth in claim 29 wherein the means providing a floating relationship for each individual tool includes a first spring biasing the tool away from the working surface and a second spring biasing the tool toward the working surface and wherein the second spring exerts a greater force on the tool than the first spring.

31. The combination set forth in claim 27, including,
means operatively coupled to the retaining means and to the actuatable means for providing for a controlled adjustment in the position of the actuatable means relative to the retaining means in a rotary direction having a particular axis substantially parallel to the working surface and in a direction substantially perpendicular to the working surface.

32. The combination set forth in claim 31, including,
a plurality of solenoids each operatively associated with an individual one of the actuatable means,
a plurality of armatures each operatively associated with an individual one of the solenoids for movement by the associated solenoid toward the working surface when the associated solenoid is energized,
means operatively coupled to the armature in each of the actuatable means for biasing the armature away from the working surface,
means operatively coupled to the actuatable means and the associated armature for producing a movement of the actuatable means with the armature toward and away from the working surface, and
means operatively coupled to the actuatable means for biasing the actuatable means in a direction away from the working surface.

33. The combination set forth in claim 27, including,
a reservoir in at least a particular one of the tools for holding the ink,
means in the particular tool for providing for a flow of the ink in the reservoir to to the tip of the tool, and
means in the particular tool for providing for a flow of air into the tool at a position above the reservoir to provide for a continuous and controlled flow of fluid through the reservoir to the tip of the particular tool.

34. The combination set forth in claim 33, including,
means operatively coupled to the particular tool for operating upon the ink in the reservoir, during the movement of the particular tool along the working surface, to facilitate the flow of the ink from the reservoir during such movement, and
means operatively coupled to the particular tool for inhibiting the flow of ink from the reservoir to the tip of the particular tool during interruptions in the movement of the particular tool along the working surface.

35. The combination set forth in claim 34, including,
the means facilitating the flow of ink from the reservoir including means for exerting a force on the ink in the reservoir in the direction of the working surface, and
means for varying the force exerted on the ink in the reservoir in the direction of the working surface in accordance with variations in the speed of movement of the particular tool along the working surface.

* * * * *